United States Patent
Duffy

(10) Patent No.: US 6,797,028 B2
(45) Date of Patent: Sep. 28, 2004

(54) "PUSH-ON" SELF ATTACH ADAPTIVE FILTER

(75) Inventor: Dean R. Duffy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/074,711

(22) Filed: Feb. 13, 2002

(65) Prior Publication Data

US 2003/0150196 A1 Aug. 14, 2003

(51) Int. Cl.[7] .............................................. B01D 46/52
(52) U.S. Cl. .................... 55/385.2; 55/355; 55/502; 55/508; 55/490; 55/507; 55/511; 55/513; 55/DIG. 31; 55/DIG. 35; 454/187
(58) Field of Search ............................ 55/385.1, 385.2, 55/355, 490, 502, 507, 508, 511, 513, DIG. 31, DIG. 35; 454/187

(56) References Cited

U.S. PATENT DOCUMENTS

| | | | |
|---|---|---|---|
| 2,709,489 A | | 5/1955 | Keebler |
| 3,782,082 A | | 1/1974 | Smith et al. |
| 4,088,463 A | | 5/1978 | Smith |
| 4,175,936 A | | 11/1979 | Lough et al. |
| 4,518,405 A | | 5/1985 | Lough et al. |
| 4,545,793 A | | 10/1985 | Shuler |
| 4,600,419 A | | 7/1986 | Mattison |
| 4,946,484 A | | 8/1990 | Monson et al. |
| 5,902,361 A | * | 5/1999 | Pomplun et al. ............... 55/502 |
| 6,045,598 A | * | 4/2000 | Fath et al. ...................... 55/502 |
| 6,117,202 A | * | 9/2000 | Wetzel ........................... 55/502 |
| 6,123,753 A | | 9/2000 | Craig |
| 6,162,272 A | * | 12/2000 | Michaelis et al. ............. 55/502 |
| 6,267,793 B1 | | 7/2001 | Gomez et al. |
| 6,267,796 B1 | * | 7/2001 | Schottmer ..................... 55/502 |
| 6,406,509 B1 | * | 6/2002 | Duffy ............................ 55/502 |
| 6,454,826 B2 | * | 9/2002 | Fath et al. ..................... 55/502 |
| 2001/0022069 A1 | | 9/2001 | Fath et al. |

FOREIGN PATENT DOCUMENTS

WO    WO 01/02080 A1    1/2001

* cited by examiner

*Primary Examiner*—Minh-Chau T. Pham
(74) *Attorney, Agent, or Firm*—Gary L. Griswold; Robert W. Sprague; William J. Bond

(57) ABSTRACT

There is provided in a standard ceiling system, having suspension rails or elements a movable air delivery diffuser resting on the suspension elements and a filter panel inserted into and retained between the suspension elements and the air delivery diffuser. The filter panel has a filter frame and an attached filter designed to be inserted into and retained on the suspension elements of the suspension ceiling. The filter frame has an inner face and an outer face with a filter media retained in the filter frame. The outer edges of the filter media are located and retained adjacent the filter frame inner face. The filter frame outer face has a flexible perimeter flange projecting outwardly from an uppermost portion of the filter frame outer face. This flexible perimeter flange can bend inwardly so as to be substantially flush with said frame outer face and can then flex back outward to engage the suspension elements. The flexible flange preferably can also extend outward so that it is in a direction substantially perpendicular to the filter frame outer face, so that it can be retained between, and frictionally engage, the suspension elements and an outermost edge of the air delivery diffuser or plenum otherwise resting on the suspension elements.

44 Claims, 6 Drawing Sheets

"PUSH-ON" SELF ATTACH ADAPTIVE FILTER

BACKGROUND OF THE INVENTION

The invention relates to a panel filter for use with an air diffuser or diffuser in a suspended-type ceiling.

Suspended ceilings are used extensively in modem office, and other public building, environments. This efficient ceiling design allows easy access to utilities with rapid and easy removal and replacement of ceiling panels. These suspended ceilings have a more or less standard design with ceiling panels resting on T-shaped suspension rails. Also resting on these T-shaped rails often is an air delivery diffuser, which supplies air via ductwork from a central plant. Often this air is filtered at the plant source but it has also been proposed to filter the air at the diffuser. This particularly has been the practice with clean room applications. U.S. Pat. No. 4,088,463 provides a diffuser that is specifically designed to accept a filter that can be quickly changed from below. The filter is retained in a specifically designed housing and held in place with screw fasteners or the like. However, this design requires that the standard air delivery diffuser must be removed and replaced. Other clean room applications also are also highly engineered to provide hermetic sealing and require non-standard diffuser or ceiling designs, such as disclosed in U.S. Pat. No. 4,518,405. In this patent, a silicone or like seal is broken by a pre-attached string attached to the filter, running from one side of the seal to the opposite side, when the string is pulled it cuts through the seal releasing the filter. The filter is held in place by discrete retaining clips on the filter frame or the suspended ceiling framework. Specifically designed ceiling systems that can accommodate mating filter panels are also proposed in U.S. Pat. Nos. 4,545,793; 4,946,484; 3,782,082; 4,175,936 and 6,267,793. These proprietary systems all require nonstandard suspension ceiling systems designed to accommodate specific mating filter panels.

There is a need for providing existing standard suspension ceiling units with appropriate filters that can easily be attached, replaced and removed without modification of the existing ceiling suspension system or air diffuser. Particularly, there is a need for providing filter elements on an as needed or emergency basis to particular rooms which filters can be easily installed from below.

SUMMARY OF THE INVENTION

In the invention, a standard ceiling system, comprising suspension rails or elements are provided with a movable air delivery diffuser resting on the suspension elements and a filter panel inserted into and retained between the suspension elements and the air delivery diffuser. The filter panel comprises a filter frame and an attached filter designed to be inserted into and retained on the suspension elements of the suspension ceiling. The filter frame has an inner face and an outer face with a filter media retained in the filter frame. The outer edges of the filter media are located and retained adjacent the filter frame inner face. The filter frame outer face has a flexible perimeter flange projecting outwardly from an uppermost portion of the filter frame outer face. This flexible perimeter flange can bend inwardly so as to be substantially flush with said frame outer face and can then flex back outward to engage the suspension elements. The flexible flange preferably can also extend outward so that it is in a direction substantially perpendicular to the filter frame outer face, so that it can be retained between, and frictionally engage, the suspension elements and an outermost edge of the air delivery diffuser or plenum otherwise resting on the suspension elements.

BRIEF DESCRIPTION OF THE DRAWING

Preferred embodiments of the invention currently contemplated are illustrated in the following drawings.

DESCRIPTION OF THE PREFERRED EMBODIMENT

Figure 1:
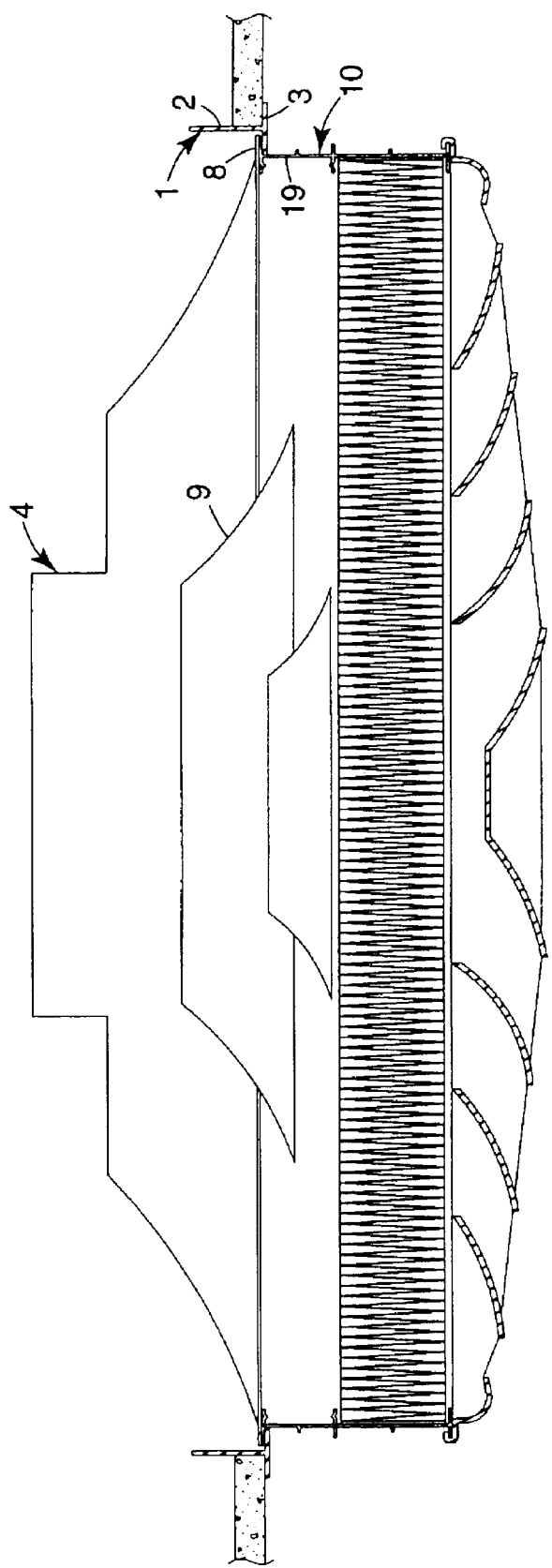
FIG. 1 is a side view of a first embodiment of an invention filter panel.
Figure 2:
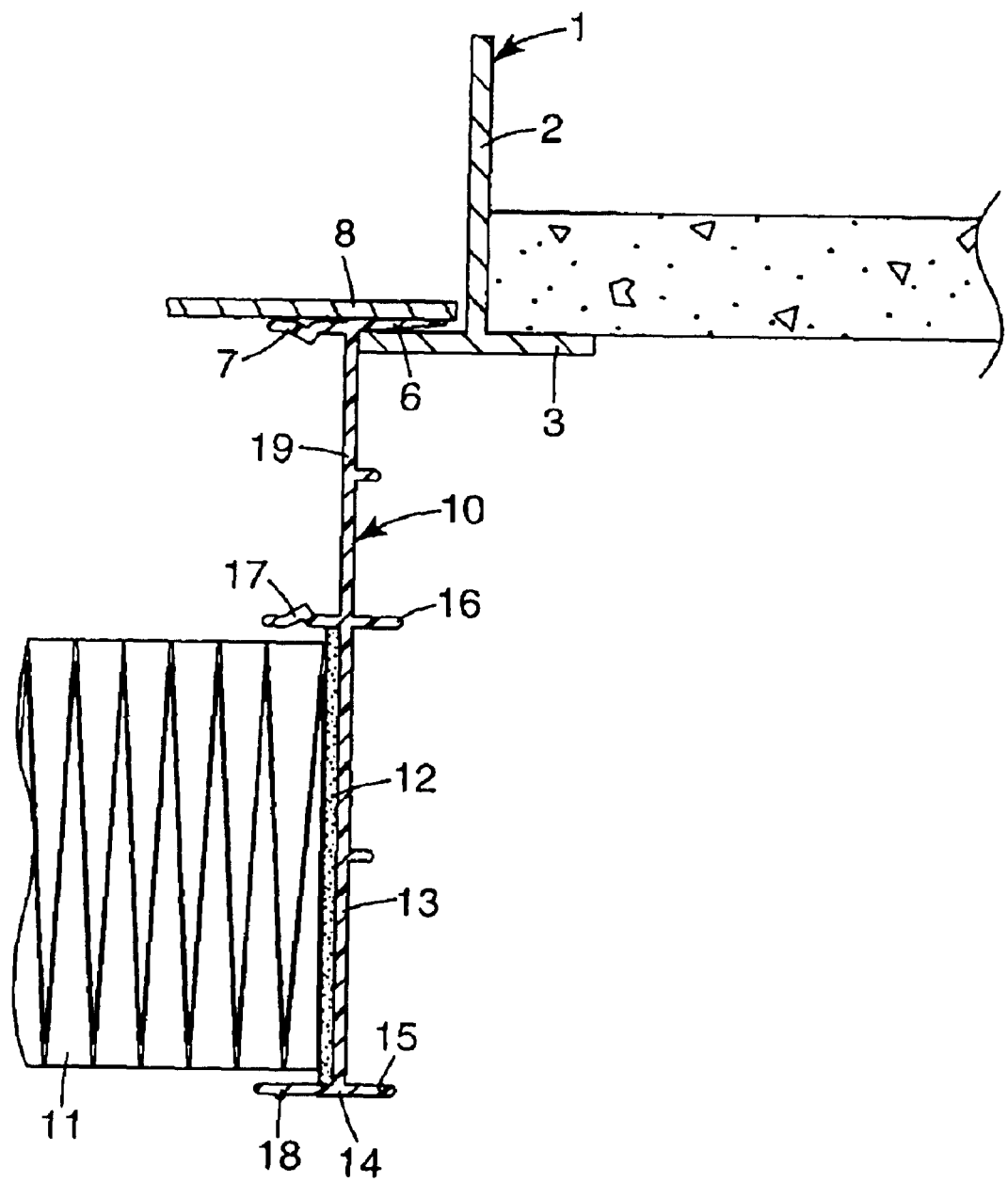
FIG. 2 is a cutaway side view of an embodiment of the invention panel filter retained in a suspension ceiling.

FIGS. 1 and 2 show a side view of the invention filter panel and a filter panel as inserted in a suspension ceiling. The suspension ceiling comprises T-shaped suspension elements 2. The suspension elements generally have a vertical member 1 and a horizontal member 3, on which rests ceiling panels and at least one air diffuser 4. The air delivery diffuser 4 generally is retained in place solely by its weight, gravity, resting on the horizontal members 3 of the T-shaped suspension elements 2. As shown in FIG. 2, the filter panel 10 has a filter 11, which is retained in a filter frame 13. At an uppermost portion of the frame is a flexible flange 6, which is retained between the T-shaped suspension elements 2 horizontal member 3 and an outer lip or edge 8 of the air diffuser. The filter frame 13 has an inner face and an outer face where the inner face is attached to the filter element 11. As shown in FIG. 2 this attachment is accomplished using an adhesive 12 which can be a conventional hot melt, pressure-sensitive or like adhesive. Alternatively, a nonadhesive thermoplastic material can be used as the filter retaining material as could a foam or a nonwoven type material, which may or may not contain adhesive fibers or an adhesive coating or the like. Nonwovens or foams could retain the filter by adhesion and/or by friction, however, if friction alone is used, the filter must be rigid enough to press into the foam, nonwoven or like compressible material. The filter frame 13 as shown has a series of ribs 15, 16, 17 and 18, which provide structural rigidity and can be used to contain the filter 11 retaining material 12. For example, the ribs can be used to contain the adhesive material 12 used to hold the filter to the filter frame 13. The filter frame 13 shown in FIGS. 1 and 2 also has an extension element 19, which distances the filter from the ceiling. This extension element is used to accommodate the possibility that the air diffuser 4 may have diffusion elements 9 which extend below the plane of the ceiling. Further, a rib 7 may be used to provide further support for the air diffuser and greater rigidity to the frame.

Figure 3:
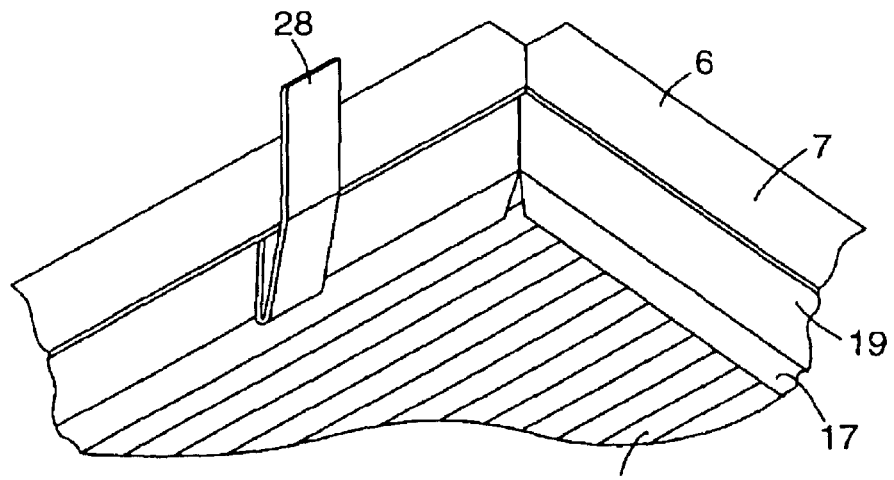
FIG. 3 is a perspective cutaway view of an alternative embodiment of the invention filter panel.
Figure 4:
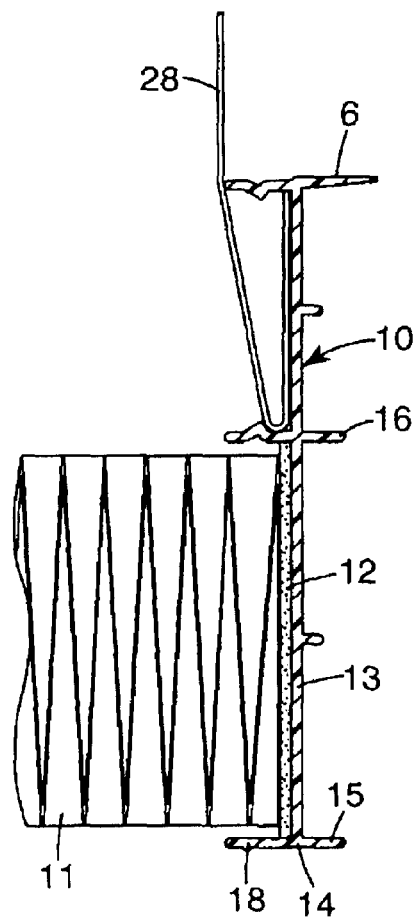
FIG. 4 is a side view of the FIG. 3 embodiment retained in a suspension ceiling.

FIGS. 3 and 4 show an alternative embodiment of the invention filter panel where discrete clips or extension elements 28 are provided which extend upward beyond the uppermost portion of the filter frame. These clips are used where the air diffuser is recessed into the ceiling. The clips 28 push the diffuser off the suspension rails 1 while the filter is being inserted allowing flexible flange 6 to be compressed by the suspension rails or elements, and not a portion of the air diffuser, so that when the flexible flanges are pushed pass the suspension elements the air diffuser is suspended off the suspension rails allowing the flexible flanges to snap outward and engage with the horizontal members of the T-shaped suspension elements 3. Generally, the clip height, above the filter frame uppermost portion with the flexible flange, should be approximately the same height, or a little less, than that of the recess of the main body portion of diffuser above the filter frame, from the diffuser lip or edge resting on the suspension rail. These clips can be made to be adjustable by having break off elements at the end of the clip so a single clip can accommodate different types of recessed diffusers.

Figure 5:
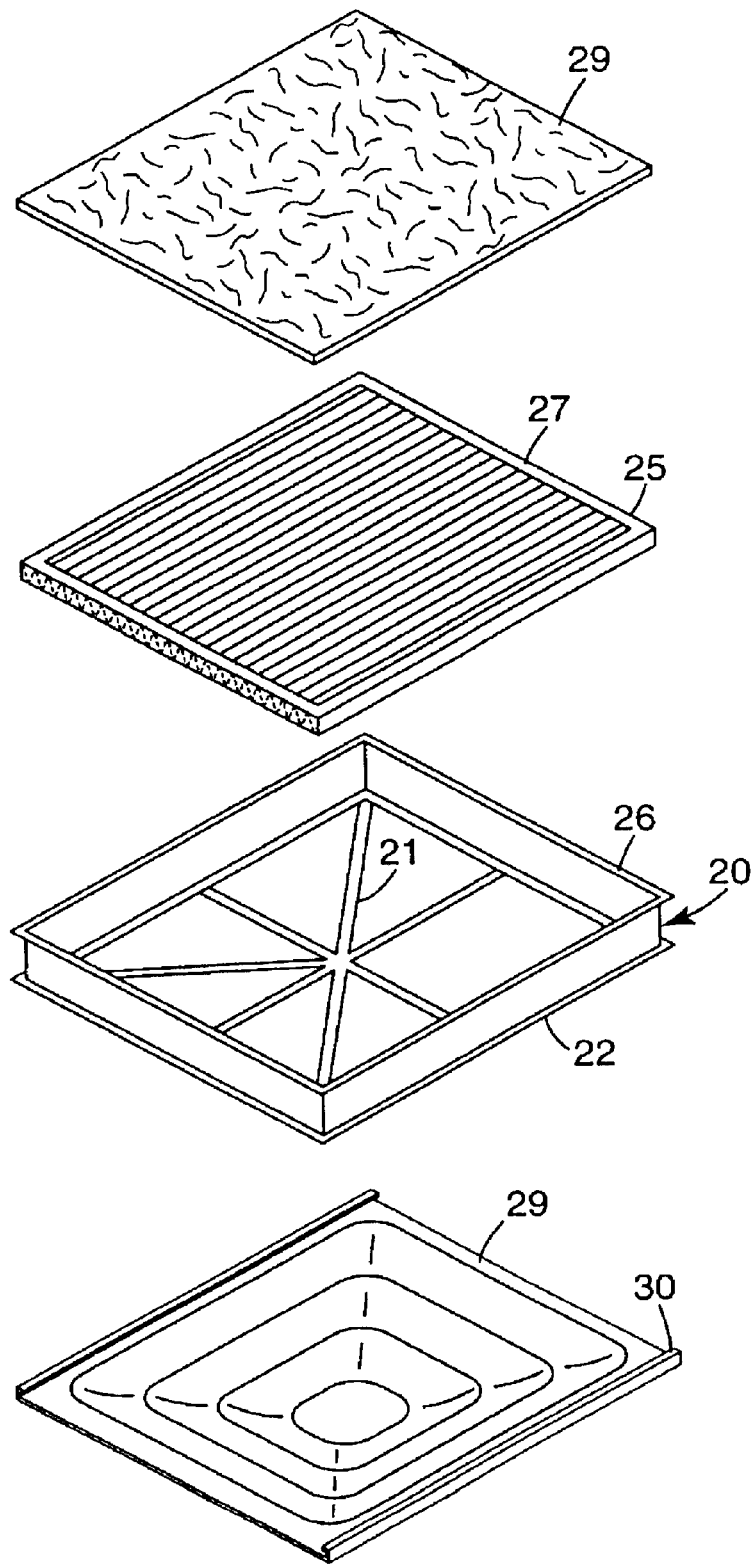
FIG. 5 is an exploded perspective view of an alternative embodiment of an invention filter panel.

FIG. 5 shows an exploded view of an alternative filter frame arrangement. The flexible flange 26 is provided on the uppermost edge of an injection molded filter frame 20. A bottom edge portion of the filter frame has a rim 22 onto which a secondary diffuser or grill plate 29 can be slid with a suitable L-shaped retaining element 30. Cross bars 21 are integrally molded onto the filter frame to support a pleated particulate filter 27, which optionally contains a flexible foam or like edge seal 25. Further, a carbon or odor-type filter 29 can also be provided either above or below the pleated particulate filter 27.

Figure 6:
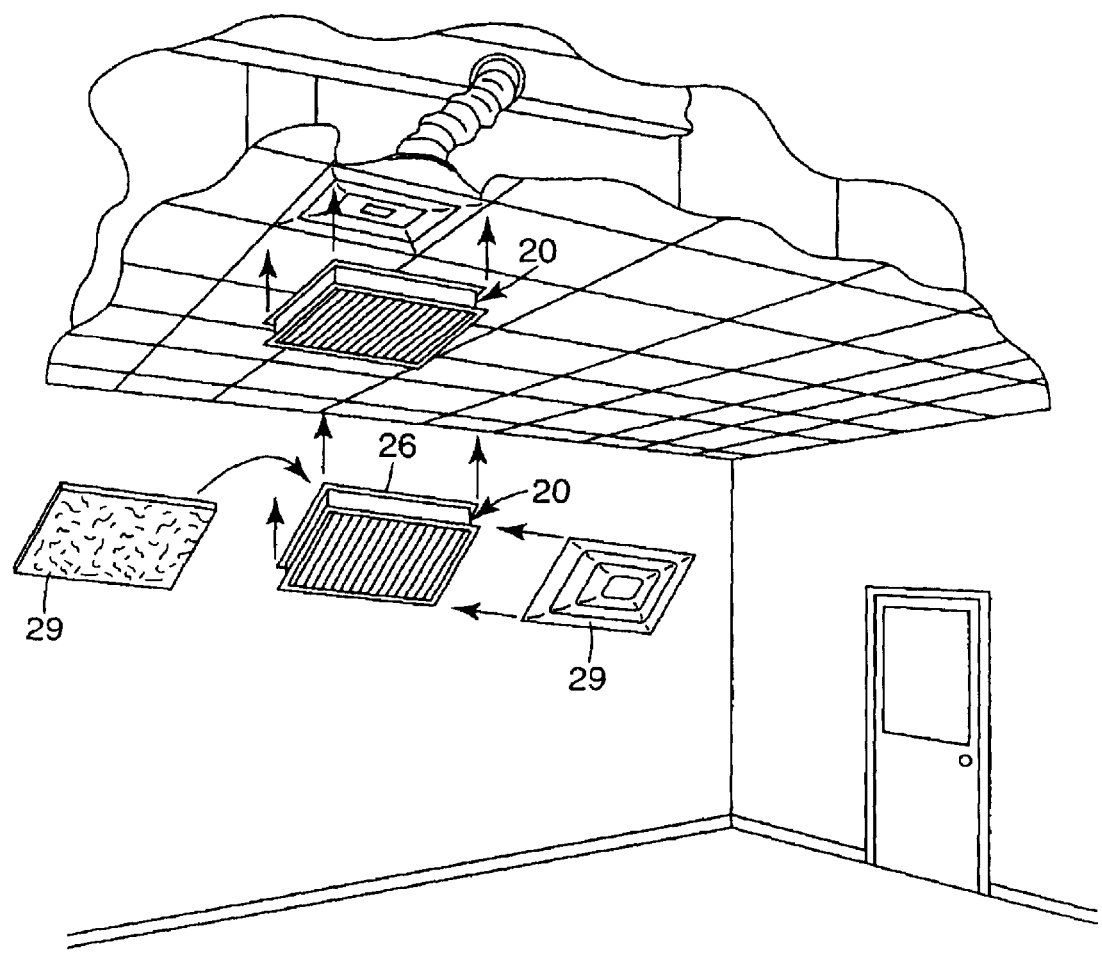
FIG. 6 is an exploded perspective view of an invention filter panel as it would be inserted onto a suspended ceiling.

FIG. 6 further shows this embodiment filter being inserted into a suspended ceiling from below. Generally, the user would press the filter panel upwardly, pressing against the air delivery diffuser, which would be moved away and off the suspension rails by the uppermost edge of the filter frame and/or any extension clips or the like. Once the flexible flange 26 had cleared the suspension rails, the filter flange 26 would then fall into place on the horizontal elements 3 of the T-shaped suspension elements 2 and so as to allow it to be sandwiched between the suspension elements or rails and the overlying air plenum or diffuser.

Figure 7:
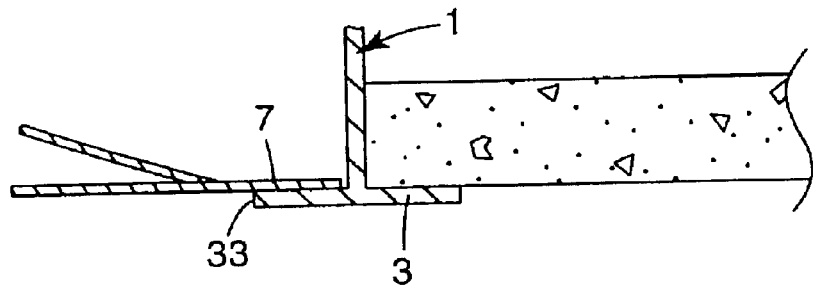
FIGS. 7–9 are a series of exploded side views of an invention filter panel being inserted into a suspension ceiling having T-shaped suspension elements.
Figure 8:
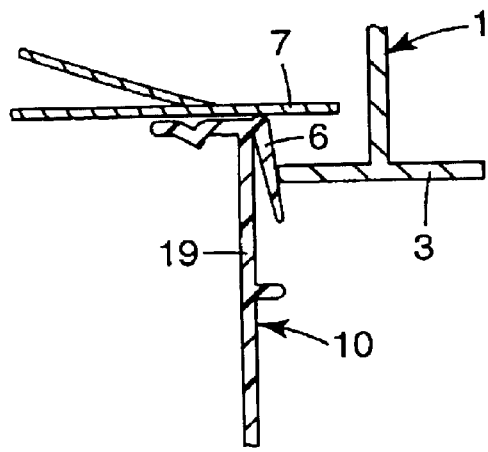
Figure 9:
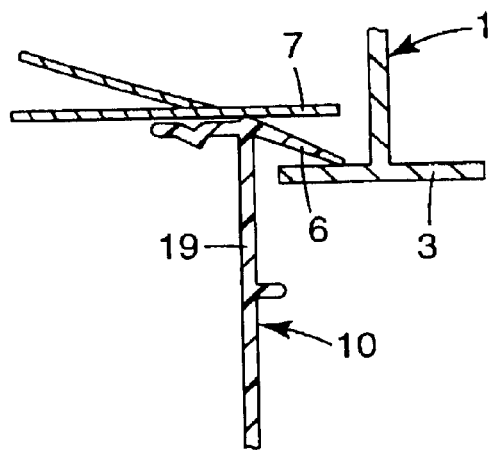

The series of FIGS. 7–9 show this in more particular detail. FIG. 7 shows the air diffuser lip 7 initially resting on the suspension rails 2. FIG. 8 shows the filter panel 10 being pressed up into the opening with the upper edge of the filter panel pushing an air diffuser lip 7 off the rails while an edge 33 of the horizontal elements 3 of the rails compress the flexible flange 6 allowing the filter housing to pass through the opening. Once the filter frame 10 has been extended up into the opening past the height of the flange element 6, the flange 6 pops outward due to their elastic recovery force. The fact that the air diffuser has been pushed off the rails allows the flange to then engage the suspension rail's horizontal element 3 as shown in FIG. 9. The filter panel is then released so the diffuser is allowed to come to rest capturing the flange between the outer lip of the diffuser and the horizontal element of the suspension rail as shown in FIG. 2. The filter is retained in place due to the frictional force between the flange and the overlying diffuser lip 7 and the underlying suspension rail or element 3. The flange 6 is preferably substantially continuous around the entire outer edge of the filter frame for the best retention and sealing.

In one embodiment, the filter frame can be formed from a continuous strip frame. The continuous strip frame can be formed into three or more (up to an infinite number if the sidewall sections(s) is formed into a circular filter frame) sidewall sections having a substantially flat sidewall and projecting filter retaining tabs which form a channel on a first face of the sidewall section for containing the adhesive potting compound. The sidewall sections are separated by corner notches extending through the retaining tabs at least to the substantially flat sidewalls. Two terminal sidewall sections meet to form a seam such that the sidewall sections circumscribe the filter media peripheral sidewalls. This continuous strip frame can be formed by the steps as described in WO Patent No. 00/102080 the substance of which is incorporated by reference in its entirety, not necessarily in order:

a) extruding of continuous strip frame blank comprising at least a substantially flat sidewall and optionally at least two projecting filter retaining tabs forming a continuous channel on a first face of the continuous strip frame blank and a flexible perimeter flange at the uppermost portion of the sidewall on the second opposing face;

b) notching the filter retaining tabs to form corner notches which corner notches extend at least to the substantially flat sidewalls creating sidewall section between the corner notches and optionally scoring first and/or second faces of the sidewall portions to form living hinges; and c) cutting the continuous strip frame blank into discrete strip frame blanks. The filter can then be attached by applying an adhesive potting compound into the channels on the first face of the strip frame blanks; followed by attaching a filter media to at least one sidewall section first face having the adhesive potting compound; wrapping the remaining sidewall sections around the filter media wherein the sidewall sections lengths generally correspond to filter media sidewall lengths; imbedding the filter media sidewalls into the adhesive potting compound in the sidewall section channels; and setting the adhesive potting compound to form a framed filter wherein the sidewall sections meet to form a seam such that the sidewall sections completely circumscribe the filter media peripheral sidewalls.

The perimeter flange is generally an elastically deformable thin ridge-like element where the elasticity generally is provided by deformation resistance of the flange thermoplastic material. This property of elastic deformation is generally provided by a plastically or elastically deformable material, for example, polyolefins such as; polypropylenes, polyethylenes, ethylene/propylene, ethylenepropylenediene copolymers, blends, and the like; polyesters; nylons; ABS copolymers; styrene/diene block copolymers, polyvinylchlorides; etc. The filter frame blank sidewall sections are generally formed of thermoplastic polymers that are relatively rigid, which may also be polymers exhibiting elastic deformation resistance. Suitable polymers for forming the sidewall sections include; polyolefins such as; polypropylenes, polyethylenes, ethylene/propylene copolymers, blends, and the like; polyesters; nylons; ABS copolymers; polyvinylchlorides; etc. These polymers can also include particulate additives for added rigidity such as talc, glass fibers, or the like at levels generally less than 30 percent by weight.

Generally, the flexible flange is substantially continuously provided along the entire perimeter of the filter frame to effectively seal the filter frame preventing bypass of significant amounts of air between the suspension elements and the air diffuser frame. The flexible flange is preferably a thermoplastic material, which is integrally molded or extruded with the filter frame. The flange could also be attached separately by adhesives or other conventional bonding technique, including being molded into place when forming the filter frame sidewall. The filter frame and flexible flange if molded or extruded could be formed of the same or different thermoplastic polymers. The flange in this case could be nonextruded materials such as thin metal, chipboard or the like. The flexible flange can be formed of a thermoplastic elastic material, which increases the friction between the air diffuser and the suspension elements enhancing the retention of the filter panel. Also, the flexible flange can be provided with a high friction surface, over at least a portion of the flange such as an elastic bead, an attached nonwoven, adhesive or the like.

In a further alternative, the top of the filter frame can have a compressible sealing element material on at least a portion of a top edge to form a seal against the air diffuser. The flexible flange can also contain a sealing element on at least one surface. Typical compressible sealing elements could be foams, compressible elastics, nonwovens or the like.

EXAMPLE

A filter of the invention was constructed using the framing method generally described in WO 00102080 contained herein as reference. To form the frame of the filter two extruders were connected to a feed block/coextrusion die assembly capable of producing a continuous strip frame material, including a flexible perimeter flange, having a profile similar to that illustrated in FIG. 2. Sidewall and retaining tab segments of the strip frame material were 1.30 mm thick, the sidewall portion of the strip frame material was 80.5 mm wide, the filter retaining tabs were 7.6 mm wide, and the flexible perimeter flange was 11.5 mm long and had a tapered profile ranging from 1.3 mm at its juncture with the sidewall to 0.6 mm. at its tip. The sidewall and filter retaining tab portions of the strip frame were formed from a glass fiber reinforced polypropylene resin (8% by weight fibrous glass) available from Prime Source Polymers. Inc. Warren, Mich., which was delivered to the feedblock/die assembly as a molten stream at a temperature of 205° C. from the first extruder. The integral flexible perimeter flange portion of the strip frame material was formed from Santoprene™, available from Advanced Elastomer Systems, Akron, Ohio which was delivered to the feedblock/die assembly as a molten stream at a temperature of 205° C. from the second extruder. Living hinges were formed in the strip frame material by cutting indexed score lines into the two sidewall surfaces of the strip frame material.

Score lines were cut into the inner sidewall and the retaining tabs concurrently notched to a 90° included angle using a utility knife blade adjusted to cut into the sidewall surface to a depth of approximately 0.15 mm. Score lines and notches were cut into the strip frame materials at intervals of 579 mm defining frame segments which subsequently become end and side wall portions of the completed framed filter (described below). Indexed score lines were then cut into the opposite, or outer, sidewall surface to a depth of approximately 0.15 mm while concurrently cutting the flexible perimeter flange (90° angle) using a rotary knife to complete formation of living hinges.

A filter element blank was formed by pleating a 57.9 cm wide portion of a synthetic nonwoven filter material like that described in U.S. Pat. No. 6,123,753 to Wu et al. The high efficiency filtration medium employed was a web of electret charged fibers of polypropylene. The nonwoven filter web had a basis weight (BW) of 40 grams/m$^2$, an effective fiber diameter (EFD) of less than 5 microns and a penetration (PEN) of less than 0.03%. The filter medium used had a HEPA performance rating. The filter blank had a peak-to-peak pleat spacing of 5.5 mm and a pleat depth of 45 mm.

The pleated blank was stabilized with beads of adhesive type 3748, 3M Company, St. Paul, Minn.

The scored and notched strip frame blank (described above) was placed in a framing jig. The framing jig comprised four rectangular components, each incorporating two retaining steel elements spaced 81 mm apart, which frictionally retained the strip frame blank in register in the framing jig. The four framing jig components were connected by three hinges, which allowed the jig to be formed around the pleat pack. A spring clip was placed on one edge of these components proximal to their unhinged ends to provide a means for closing the framing jig around strip frame blank.

The framed filter assembly was prepared by inserting a discrete strip frame blank into the framing jig, positioning the living hinges of the frame blank over the hinges of the framing jig. A ribbon of hot melt adhesive, such as type 6111, available from 3M Company, St. Paul, Minn., was dispensed from a hot melt dispenser at a temperature of approximately 180° C. into the strip frame blank, filing the channel created by the retaining tabs and the sidewall portions of the strip frame blank to a depth of approximately 1.5 mm. The framing jig was then rotated 90° and formed around the filter element blank, potting the pleated filter edges and end pleats into the hot melt adhesive. The framing jig was tightly closed around the pleat pack and a spring steel clamp looped around the two proximal anchors to keep the framing jig tightly registered with the pleat pack until the hot melt adhesive solidified. After the adhesive had solidified, the clamp was removed and framed filter separated from the framing fixture.

Filtration performance of the filter of the example was evaluated by fixing the filter to the outlet of a standard (61 cm×61 cm) ceiling diffuser located in a closed room with air delivered and circulated through a central heating ventilation and air conditioning system. The filter was secured in its placement by the compression of the flexible perimeter flange between the outlet rim of the diffuser and the ceiling support as shown in FIG. 1. The room into which air was delivered was approximately and had a 2.74 m ceiling height (30.8 m$^3$). Airflow through the filter was determined to be 3.34 m$^3$/min, which would provide 6.5 room-volume exchanges every hour. Prior to placement of the filter, the airflow from the diffuser outlet was 4.53 m$^3$/min. To measure the particle removal performance of the filter a particle count was made in proximity of the air supply before and after placement of the filter. Particle count was determined using a P-Trak Ultrafine Particle Counter, Model 8525, available from TSI, St. Paul, Minn. With only the diffuser in place the room particle count was 608 particles per cubic centimeter, for particles 0.01 micron in diameter and above averaged over a 10 second sampling period. Particle count with the filter in place was 1.0 particle per cubic centimeter, almost a total reduction in detectable particulate matter.

We claim:

1. A filter panel designed to be inserted into and retained on a suspension ceiling comprising a filter media retained in a filter frame, the filter frame having an inner face and an outer face; the filter media located adjacent the filter frame inner face, the outer face having a flexible perimeter flange projecting outwardly from an upper portion of the filter frame outer face, which flexible perimeter flange can bend inwardly so as to be substantially flush with said frame outer face and can extend outward in a direction substantially perpendicular to the filter frame outer face and is located at the top edge of the filter frame so as to for a substantially flat surface on which an air olenumn or diffuser can rest.

2. The filter panel of claim 1 wherein the flexible flange is substantially continuously provided along the entire perimeter of the filter frame and extends outward in a direction substantially perpendicular to the filter frame outer face.

3. The filter panel of claim 2 wherein the flexible flange is a thermoplastic material.

4. The filter panel of claim 3 wherein the flexible flange is integrally molded with the filter frame.

5. The filter panel of claim 4 wherein the filter frame and flexible flange are formed of the same thermoplastic polymer.

6. The filter panel of claim 4 wherein the flexible flange is formed of a thermoplastic elastic material.

7. The filter panel of claim 4 wherein the flexible flange has a high friction surface, over at least a portion of the flange.

8. The filter panel of claim 4 where the top of the filter frame has a compressible material on at least a portion to form a seal.

9. The filter panel of claim 1 wherein the filter frame top edge further has a support member projecting inwardly from the filter frame inner face.

10. The filter panel of claim 9 wherein the support member is substantially coplanar with the flexible flange when it is fully extended horizontally.

11. The filter panel of claim 2 wherein the flexible flange contains a sealing element one at least one surface.

12. The filter panel of claim 11 wherein the flange sealing element is a fibrous filtering material.

13. The filter panel of claim 2 wherein the filter is attached to the inner surface of the filter frame.

14. The filter panel of claim 13 wherein the filter media is a fibrous particle filter media.

15. The filter panel of claim 14 wherein the filter media is pleated.

16. The filter panel of claim 13 wherein the filter media is adhesively attached to the filter frame.

17. The filter panel of claim 1 wherein the filter media is removably attached to the filter frame.

18. The filter panel of claim 1 wherein the flexible flange is adhesively attached to the filter frame sidewall.

19. The filter panel of claim 2 wherein the filter frame includes one or more rib elements.

20. The filter panel of claim 19 wherein at least one rib element extends substantially along the entire perimeter of the filter frame.

21. The filter panel of claim 2 wherein the flexible flange is located below a top edge of the filter frame.

22. The filter panel of claim 21 wherein the top edge of the filter frame comprises a discrete removable extension element.

23. The filter panel of claim 2 wherein the filter frame has an attachment means for accepting a diffuser panel at a lower edge region of the filter frame.

24. A ceiling filtration system comprising suspension rails having substantially horizontal element, a movable air delivery plenum or diffuser resting on the suspension rail horizontal elements and a filter panel inserted into and retained between the suspension rails and the air delivery plenum or diffuser, the filter panel is designed to he inserted into and retained on a suspension ceiling and comprises a filter media retained in a filter frame, the filter frame having an inner face and an outer face, the filter media located adjacent the filter frame inner face, the outer face having a flexible perimeter flange projecting outwardly from an uppermost portion of the filter frame outer face, which flexible perimeter flange can bend inwardly so as to be substantially flush with said frame outer face and can extend outward and which flexible flange is located at the top edge of the filter from and forms a substantially flat surface on which the air delivery plenum or diffuser rests.

25. The filter panel of claim 24 wherein the flexible flange is substantially continuously provided along the entire perimeter of the filter frame and extends outward in a direction substantially perpendicular to the filter frame outer face.

26. The filter panel of claim 25 wherein the flexible flange is a thermoplastic material.

27. The filter panel of claim 26 wherein the flexible flange is integrally molded with the filter frame.

28. The filter panel of claim 27 wherein the filter frame and flexible flange are formed of the same thermoplastic polymer.

29. The filter panel of claim 27 wherein the flexible flange is formed of a thermoplastic elastic material.

30. The filter panel of claim 27 wherein the flexible flange has a high friction surface, over at least a portion of the flange.

31. The filter panel of claim 27 where the top of the filter frame has a compressible material on at least a portion to form a seal.

32. The filter panel of claim 25 wherein the filter frame top edge further has a support member projecting inwardly from the filter frame inner face.

33. The filter panel of claim 32 wherein the support member is substantially coplanar with the flexible flange when it is filly extended horizontally.

34. The filter panel of claim 25 wherein the flexible flange contains a sealing element one at least one surface.

35. The filter panel of claim 34 wherein the flange sealing element is a fibrous filtering material.

36. The filter panel of claim 25 wherein the filter is attached to the inner surface of the filter frame.

37. The filter panel of claim 36 wherein the filter media is a fibrous particle filter media.

38. The filter panel of claim 37 wherein the filter media is pleated.

39. The filter panel of claim 36 wherein the filter media is adhesively attached to the filter frame.

40. The filter panel of claim 25 wherein the filter frame includes one or more rib elements.

41. The filter panel of claim 40 wherein at least one rib element extends substantially along the entire perimeter of the filter frame.

42. The filter panel of claim 25 wherein the flexible flange is located below a top edge of the filter frame.

43. The filter panel of claim 42 wherein the top edge of the filter frame comprises a discrete removable extension element.

44. The filter panel of claim 25 wherein the filter frame has an attachment means for accepting a diffuser panel at a lower edge region of the filter frame.

* * * * *

UNITED STATES PATENT AND TRADEMARK OFFICE
CERTIFICATE OF CORRECTION

PATENT NO. : 6,797,028 B2
DATED : September 28, 2004
INVENTOR(S) : Duffy, Dean R.

It is certified that error appears in the above-identified patent and that said Letters Patent is hereby corrected as shown below:

Column 1,
Line 9, delete "modem" and insert -- modern --, in place thereof.

Column 4,
Lines 17, 18 and 20, delete "comer" and insert -- corner --, in place thereof.

Column 6,
Line 67, delete "olenumn" and insert -- plenum --, in place thereof.

Column 7,
Line 61, after "face" delete "," and insert -- ; --, in place thereof.

Column 8,
Line 1, after "face" delete "," and insert -- ; --, in place thereof.
Line 36, delete "filly" and insert -- fully --, in place thereof.

Signed and Sealed this

Twelfth Day of April, 2005

JON W. DUDAS
*Director of the United States Patent and Trademark Office*